(12) United States Patent
Vajpayee et al.

(10) Patent No.: US 11,610,610 B1
(45) Date of Patent: Mar. 21, 2023

(54) AUDIO-VIDEO SYNCHRONIZATION FOR NON-ORIGINAL AUDIO TRACKS

(71) Applicant: Amazon Technologies, Inc., Seattle, WA (US)

(72) Inventors: Avijit Vajpayee, Seattle, WA (US); Hooman Mahyar, Seattle, WA (US); Vimal Bhat, Redmond, WA (US); Abhinav Jain, Seattle, WA (US); Zhikang Zhang, Capitola, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/643,805

(22) Filed: Dec. 10, 2021

(51) Int. Cl.
*H04N 9/88* (2006.01)
*G11B 27/10* (2006.01)

(52) U.S. Cl.
CPC ................................... *G11B 27/10* (2013.01)

(58) Field of Classification Search
CPC .................................................... G11B 27/10
USPC ................ 386/264, 263, 201, 207, 241, 248
See application file for complete search history.

(56) References Cited

U.S. PATENT DOCUMENTS

| | | | |
|---|---|---|---|
| 8,640,181 B1 * | 1/2014 | Inzerillo | H04N 21/242 |
| | | | 725/151 |
| 9,565,426 B2 * | 2/2017 | Yang | H04N 21/43072 |
| 2014/0259050 A1 * | 9/2014 | Goldberg | H04N 21/43076 |
| | | | 725/32 |

* cited by examiner

*Primary Examiner* — Robert Chevalier
(74) *Attorney, Agent, or Firm* — Knobbe, Martens, Olson & Bear, LLP (57) ABSTRACT

Systems and methods are provided for detecting and correcting synchronization errors in multimedia content comprising a video stream and a non-original audio stream. Techniques for directly detecting synchronization of video and audio streams may be inadequate to detect synchronize errors for non-original audio streams, particularly where such non-original audio streams contain audio not reflective of events within the video stream, such as speaking dialog in a different language than the speakers of the video stream. To overcome this problem, the present disclosure enables synchronization of a non-original audio stream to another audio stream, such as an original audio stream, that is synchronized to the video stream. By comparison of signatures, the non-original and other audio stream are aligned to determine an offset that can be used to synchronize the non-original audio stream to the video stream.

20 Claims, 7 Drawing Sheets

AUDIO-VIDEO SYNCHRONIZATION FOR NON-ORIGINAL AUDIO TRACKS

BACKGROUND

Digital media is often presented as a single media item, but is in fact composed of multiple constituent media items. For example, what appears to an end user as a "video" is often composed of both video stream and a corresponding audio stream. In some cases, multiple alternative streams are made available. For example, a single video may be associated with multiple audio streams, which for example represent dialog spoken in various different languages. A first audio stream may be the "original," representing the audio captured simultaneously with the video. Other audio streams may be "dubbed," representing audio created after the video, such as to represent the dialog of the original audio stream in an alternative language.

A recurring challenge in providing media content to consumers is maintaining synchronization between an audio stream and a video stream, as consumers may be dissatisfied if an audio stream excessively leads or lags its associated video stream. In some cases, end users are able to identify even relatively small errors in synchronization, on the order of tens or hundreds of milliseconds. Errors in synchronization are particularly prevalent when a video stream and audio stream are separately created. For example, synchronization errors may be less common when a single recording device simultaneously captures audio and video, and more common when a video stream is created and an audio stream is later added to the video. As dubbed audio streams are by their nature created subsequent to video capture, desynchronization is particularly prevalent in media containing dubbed audio streams.

DETAILED DESCRIPTION

Generally described, aspects of the present disclosure relate to synchronizing non-original audio streams, such as dubbed audio streams, to corresponding video streams. In particular, embodiments of the present disclosure address the problem of synchronizing video with non-original audio by decomposing the synchronization into two separate processes: synchronization of video with original audio, and synchronization of original audio with non-original audio. Embodiments of the present disclosure address both these synchronization processes, thus providing synchronization of video with non-original audio. These embodiments can thus avoid direct attempts to synchronization video and non-original audio, which is often difficult under existing techniques. In some instances, embodiments of the present disclosure may utilize a pre-existing synchronization of video to original audio, such as a synchronization created during simultaneous creation of the video and original audio. In such instances, because the original audio is already synchronized with the video, synchronizing video with non-original audio may be accomplished by synchronizing the non-original audio with the original audio. Moreover, embodiments of the present disclosure provide for rapid and accurate synchronization of non-original audio with the original audio by providing for audio signatures generated according to a compressive sensing matrix. Such signatures may enable rapid matching of frames between two audio streams relative to other audio signature techniques, thereby enabling for rapid synchronization of video with non-original audio.

Problems in audio to video synchronization are particularly prevalent in non-original audio, as creation of the audio after creation of the video necessarily requires that an alignment process occur between the non-original audio and the video. Often, this alignment process is manual, and thus subject to human error. In other cases, error can be introduced by automated processes, such as due to software errors. Even errors that would otherwise appear small can often significantly impact viewing of content—for example, humans are often able to detect desynchronization on the order of tens of milliseconds.

Figure 1:
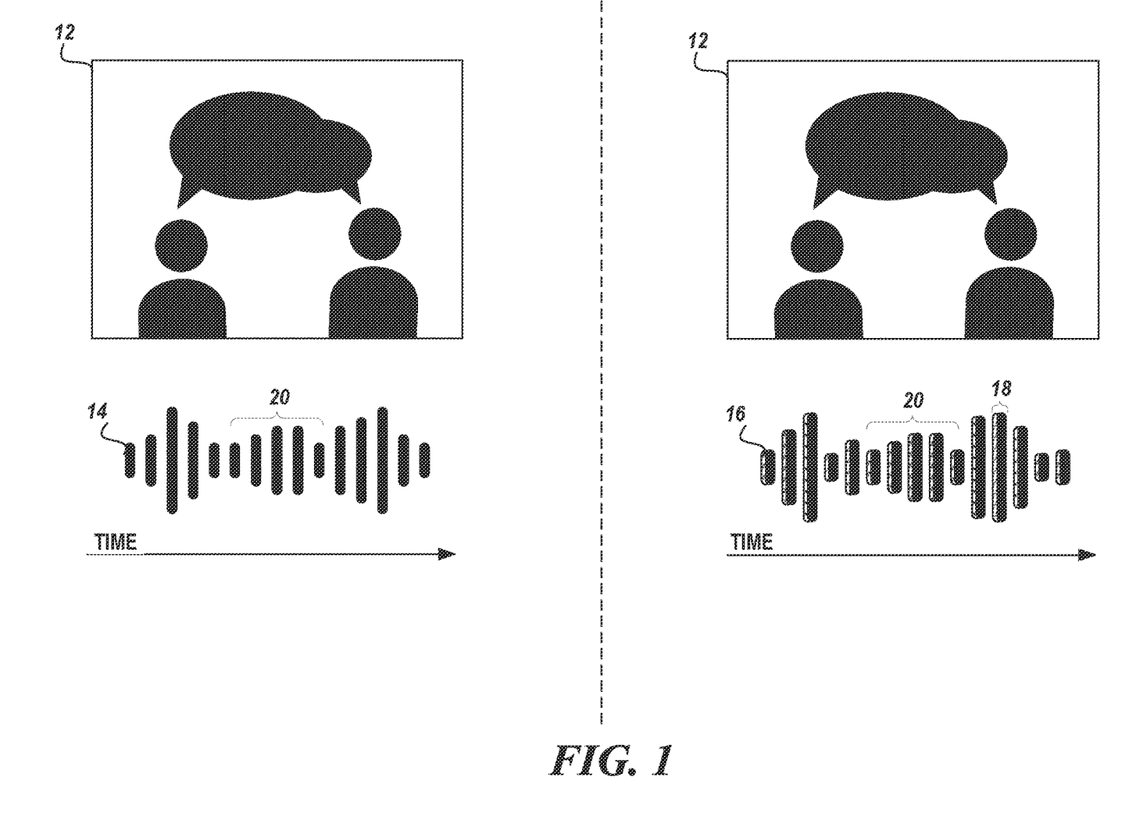
FIG. 1 is an illustrative visualization of a multimedia content that includes a video stream depiction of dialog and multiple audio streams representing the dialog, with a first audio stream being synchronized to the video stream and a second audio stream being desynchronized from the video stream.

This problem is further illustrated in FIG. 1, which depicts a multimedia content, such as a theatrical movie, that includes dialog. The content includes both video 12 (which is shown as a still image but can be assumed to represent moving images) and multiple corresponding audio streams 14 and 16. In FIG. 1, audio stream 14 is assumed to be synchronized with video 12, such that there is no perceptible difference in an event making sound, as depicted in the video 12, and hearing that sound in the audio stream 14. For example, audio stream 14 may be the original audio created simultaneously with creation of video, perhaps by the same recording device. Additionally or alternatively, audio stream 14 may have been previously synchronized with the video 12 via a synchronization process. Typically, synchronization with no perceptible difference requires that corresponding events occur in an audio stream and video stream within a few milliseconds of one another, such as within 20 milliseconds. For example, the video 12 may show a person that claps their hands once, and the clap may be simultaneously heard in the audio stream 14. As another example, the video 12 may show a person speaking, and the audio stream 14 may play the words spoken in synchronization with the lips of the person speaking. While audio stream 14 is synchronized with the video 12, alternative audio stream 16 is not. The alternative audio stream 14 may, for example, be alternative language audio for the video 12, such as dubbed audio. As shown in FIG. 1, the audio stream 16 is in fact shifted later than it should be for synchronization, resulting in a shift 18, which is visualized in FIG. 1 with shading and solid lines. Specifically, in FIG. 1, the shaded portions represent a timing of audio for correct synchronization, while the solid portions represent a timing of the audio without synchronization adjustment. Accordingly, if played without adjustment, sounds within the audio stream 16 would occur later than corresponding events in the video stream 12 by some perceptible amount (e.g., 50-100 ms). This can result in a disconcerting user experience. Moreover, while a user may be able to manually adjust the synchronization, such as by adjusting the audio stream 16 earlier and earlier until it appears synchronized, this manual process is difficult to automate as it relies on the innate ability of humans to interpret visual events and translate those events into expected audio.

Perhaps the most straightforward approach to automated synchronization of video with non-original audio is to attempt to directly synchronize the video and non-original audio by computerized comparison of those two streams. Similar synchronization has been attempted between video and original audio. For example, in "Out of time: automated lip sync in the wild" by Joon Son Chung and Andrew Zisserman, Chung and Zisserman provide a technique (dubbed "SyncNet") for utilizing neural networks to correlate lip movements, as shown in a video stream, to dialog within an audio stream. Subsequent improvements on the SyncNet model have shown to provide high accuracy in certain use cases. However, these techniques may be difficult to implement, costly in terms of computing resources, or generally provide less desirable results than embodiments of the present disclosure when applied to synchronization of video with non-original audio. For example, the SyncNet model may be wholly inapplicable to alternative-language audio, as that model generally attempts to determine correlations between lip movement and spoken words, which correlations are unlikely to exist in non-original, alternative-language audio. When applied to synchronization of video with non-original audio, and particularly to cases where the non-original audio is alternative-language audio, these techniques may not achieve synchronization sufficient to avoid perception by humans. Accordingly, there is a need for more accurate synchronization of video with non-original audio.

Embodiments of the present disclosure address these problems by providing for synchronization of video with non-original audio by synchronizing the non-original audio with original audio, which is itself synchronized to the video. Thus, embodiments of the present disclosure avoid issues such as a lack of correlation between lip movement in the video and spoken words in the non-original audio. More particularly, synchronization of non-original audio with original audio can occur by correlation of sufficiently matching portions of both audio streams, which may represent non-dubbed or otherwise unaltered content. For example, in the case of a theatrical movie, sound effects (footsteps, doors closing, gun shots, etc.) and music may remain the same between original and non-original audio. This is illustratively shown in FIG. 1, where portion 20 represents the same audio in both the original audio stream 14 and the alternative audio stream 16. By matching these portions among two audio streams, the two audio streams can be synchronized to a high degree of accuracy. For example, with respect to FIG. 1, the location of portion 20 in the original audio stream 14 may be earlier than portion 20 in the alternative audio stream 14 by the magnitude of shift 18. Accordingly, synchronization can be achieved by a comparison of the two streams 14 and 16, matching of portion 20, and determining a difference in the respective locations of portion 20 among the two streams 14 and 16.

In one embodiment, synchronization of non-original audio with original audio is conducted according to signatures of these respective audios. As used herein, the term "signature" is generally intended to refer to a sufficiently unique representation of at least a portion of an audio stream, such that two signatures can be compared to identify corresponding portions of two corresponding audio streams. For example, an audio stream may be represented a spectrogram of the audio stream, which may be a data matrix representing frequencies of the audio stream over time. Illustratively, the spectrogram may be generated by processing the audio stream through a Fourier-related transform, such as the Short-time Fourier transform. To find matching segments in two audio tracks, embodiments of the present disclosure can utilize a sliding window approach, where each portion of the signature of a first audio (e.g., non-original audio) is compared with portions in a given window of a second audio's signature, such as a window plus or minus a number of seconds from a location of the corresponding portion of the first audio. For example, the portion of a signature of an audio stream representing the 00:01:25 timestamp (in "HH:MM:SS" notation denoting hours, minutes, and seconds) of a first audio stream may be compared with the portions of a signature of another audio stream representing each frame between timestamps 00:01:23 and 00:01:27, if a two second window is used. Each comparison may identify a distance between the portions of two signatures, such as the Chebyshev distance (also known as the $L_{inf}$ distance) and identify a correspondence if a distance below a threshold minimum distance is found. For example, if the portion of a signature of a first audio stream representing the 00:01:25 timestamp of a first audio stream matches (e.g., has a distance less than the threshold minimum) the portion of the signature of the second audio stream representing the 00:01:24.875 timestamp of a second audio stream, the two frames can be said to correspond. Moreover, the difference in timestamps between the two portions can represent an audio offset for synchronizing the two audio streams. In the above example, an offset of −125 milliseconds (ms) applied to the first audio stream would synchronize the two audio stream portions, as the same audio content (as identified via digital signature) would occur at the 00:01:24.875 timestamp in both audio streams if an offset of −125 ms were applied to the first audio stream. These matching signatures may represent, for example, unaltered sound effects or music shared among the two streams. If no match is found, these portions of the two audio streams may represent non-corresponding content, such as dialog in different languages.

In some embodiments, comparison of full fidelity signatures, such as spectrograms that fully identify an audio stream, may be computationally inefficient. Accordingly, embodiments of the present disclosure may utilize reduced signatures, which may sufficiently represent each stream to enable correspondence point pairs to be identified while requiring fewer computing resources to conduct comparisons. As one illustration, low-loudness values within each signature, such as values less than a threshold level in decibels, may be reduced to zero. This may both reduce the size of data required to represent the signature and increase the signatures robustness to minor noise. As another example, a filter may be applied to audio signatures to remove from signatures those portions that are too sparse (e.g., having more than a threshold number of frequencies of 0 loudness) or that are too loud (e.g., having more than a threshold number of frequencies of loudness greater than a threshold level). These techniques, individually or in combination, may significantly reduce (e.g., by an order of magnitude) the data required to represent the audio signatures. As yet another example, some embodiments of the present disclosure may reduce signatures by applying a compressive sensing matrix to an initial signature (e.g., a spectrogram, which may be altered or filtered per the above) to generate a reduced signature. As is known in the art, compressive sensing refers to a technique in signal processing to reconstruct a signal from a limited sample set based on knowledge that the signal is sparse in a given domain. In the context of the present disclosure, sample-gathering techniques of compressive sensing can be applied to an initial signature to generate a reduced signature with sufficient fidelity to conduct comparisons to other signatures, but with greatly reduced data footprint. (Notably, and in contrast to many applications of compressive sensing, the embodiments as disclosed herein may not require or involve reconstruction of the signature after sampling occurs.) For example, compressive sensing-based sampling can occur by multiplying the signature (e.g., as spectrogram) to a randomly initialized Bernoulli matrix of dimensions M*F, where F is a frequency dimensionality matching the signature's frequency dimensionality and M is a measurement dimension equal to F divided by a compression ratio (which may be, for example, a power of 2 between $2^1$ and $2^{10}$, such as 32, 64, etc.). While a Bernoulli matrix is one example of an appropriate matrix for conducting compressive sensing-based sampling, other matrices are possible. A result of this multiplication may be a reduced signature of dimensionality M*T, where T represents the time dimensionality of the initial signature (e.g., as truncated according to the filtering noted above). Such a signature may be orders of magnitude smaller than an initial signature, enabling rapid comparisons and thus rapid synchronization.

Synchronization of two audio streams can therefore occur by conducting a portion-by-portion (e.g., frame by frame) comparison of portions of a first audio stream with corresponding windows of a second audio stream. For each match, a pair of correspondence points are identified among the two audio streams, along with an offset that synchronizes the pair of correspondence points. In one embodiment, synchronization of original and non-original audio is achieved by averaging the offsets of all correspondence point pairs to determine an overall offset between the original and non-original audio. For example, a non-original audio may be found to be a few hundred milliseconds ahead of or behind original audio, and thus synchronized with the original audio by applying the corresponding offset.

In instances where the original audio is known to be synchronized with the video, synchronization of the video and non-original audio can then occur based on applying the determined offset to the non-original audio during playback with the video. For example, the non-original audio may be delayed by 125 ms if an offset of 125 ms is applied to the non-original audio. In some instances, synchronization of video with original audio may first be verified prior to applying the offset. For example, the SyncNet model discussed above may be applied to the video and original audio to validate that the video and original audio are synchronized, or to synchronize the two streams if they are not currently synchronized. In another embodiment, synchronization of a video to an original audio (or validation of such synchronization) can occur via the techniques disclosed in U.S. patent application Ser. No. 17/301,212 entitled "Event Based Audio-Video Sync Detection," (the "'212 Application") the entirety of which is hereby incorporated by reference. Thereafter, the offset between the original and non-original audio can be applied to playback of the video and non-original audio, thus achieving synchronization between the two streams.

In some cases, a fixed offset may be insufficient to synchronize non-original audio with original audio (and thus with the video). For example, a desynchronization offset may vary over the stream. Accordingly, in some embodiments a fixed offset may be applied only when a sufficient number of offsets fall within a threshold range of one another, which range may be set according to general perceptibility of synchronization errors in humans (e.g., a range of 50 ms, 100 ms, 200 ms, etc.). To enable automatic correction of inconsistent desynchronization in non-original audio (e.g., where a synchronization offset varies during the duration of two audio streams), embodiments of the present disclosure may in some cases determine a variable offset. For example, if the offsets of each correspondence point pair vary by more than a threshold amount, the offsets may be stored as a set. Synchronization of the non-original audio to corresponding video can then be achieved by adjusting playback speed of the audio and/or the video such that the appropriate offset occurs at the appropriate location in the audio and video. For example, if an offset of −125 ms is identified at timestamp 00:01:30 of the audio an offset of −100 ms is identified at timestamp 00:01:55 of the audio, playback of the audio between these two timestamps can be increased such that the 25 seconds of audio occurs in 25.025 seconds. (Conversely, video duration may be quickened to account for reaching the correct offset, or a combination of video quickening and audio shortening may occur.) As a result, the appropriate offset is applied at both timestamps for synchronization, enabling synchronization in cases where the offset is variable. In some instances, a combination of these techniques may be applied. For example, an initial offset may be applied (e.g., as an average of all offsets in the set) and slowing/quickening may be used to reach an appropriate offset point at locations corresponding to each pair of correspondence points. Thus, synchronization can be achieved even in cases of inconsistent desynchronization.

The above-disclosed techniques may be applied in various contexts to ensure synchronization of audio and video content. For example, the above-disclosed techniques may be implemented in a content distribution system, representing computing devices configured to deliver audio-video content to end users (e.g., over a network). Illustratively, the content distribution system may programmatically process each audio-video content with one or more non-original audio streams according to the techniques described herein to detect desynchronizations between video of that audio-video content and the one or more non-original audio streams. In some embodiments, the content distribution system may reject audio-video content with such desynchronizations, such as by halting distribution of the content and notifying a provider of the content. In other embodiments, the content distribution system may programmatically correct such desynchronizations, by applying a determined offset (fixed or variable) to the non-original audio content, such that synchronization is achieved with respect to a video stream. Accordingly, the embodiments of the present disclosure can address problems with delivery of audio-video streams using non-original audio.

As will be appreciated by one of skill in the art in light of the present disclosure, the embodiments disclosed herein improve the ability of computing systems to provide synchronized streams of video and non-original audio. Moreover, the presently disclosed embodiments address technical problems inherent within computing systems; specifically, the difficulty of establishing synchronization between different media streams of a multimedia content. These technical problems are addressed by the various technical solutions described herein, including the application of audio-to-audio synchronization (e.g., using reduced signatures for each audio stream) to the problem of audio-to-video synchronization. Thus, the present disclosure represents an improvement in host devices and computing systems in general.

The foregoing aspects and many of the attendant advantages of this disclosure will become more readily appreciated as the same become better understood by reference to the following description, when taken in conjunction with the accompanying drawings.

Figure 2:
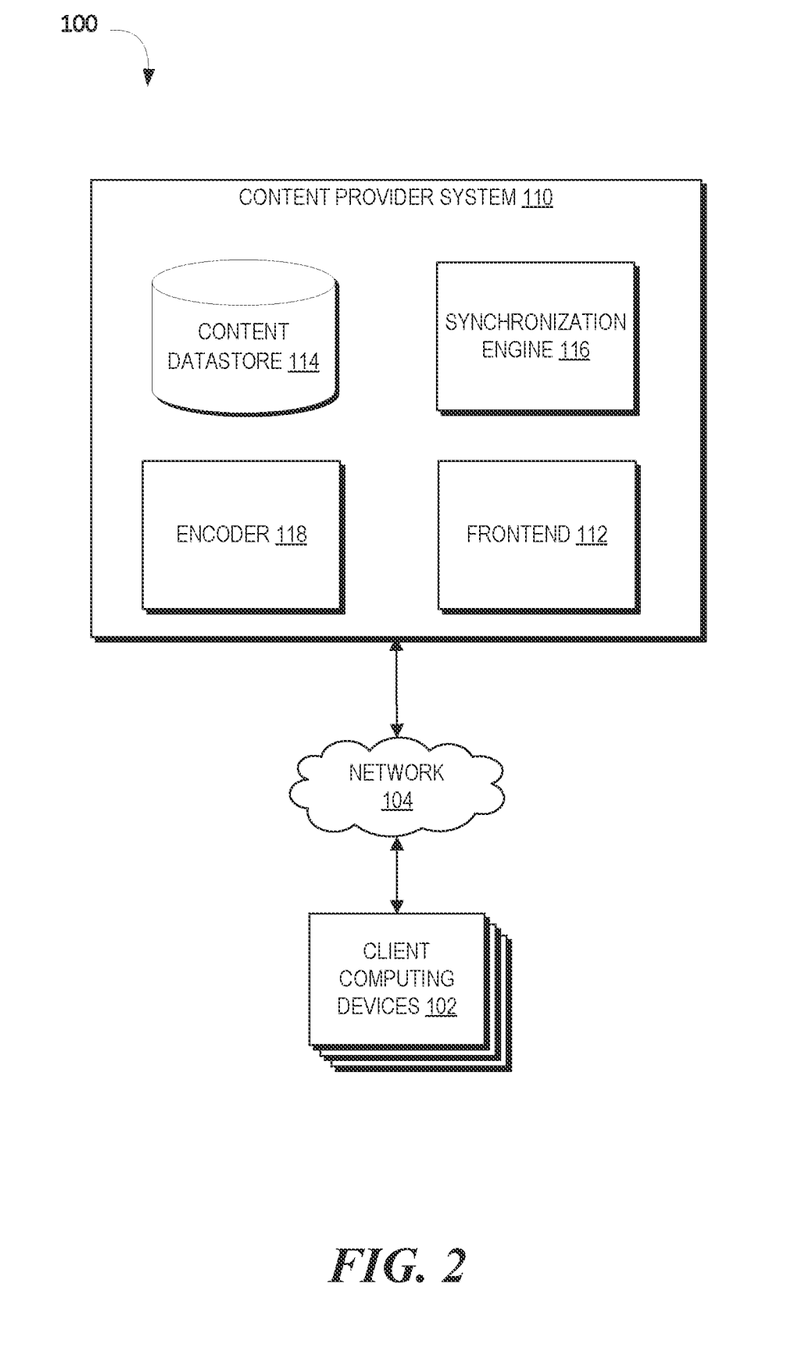
FIG. 2 depicts an example computing environment including a content provider system in which embodiments of the present disclosure can be implemented to synchronize a non-original audio stream to a video stream.

FIG. 2 depicts an example computing environment 100 including a content provider system 110 in which embodiments of the present disclosure can be implemented. Illustratively, the content provider system 110 can represent a network-accessible system to access multimedia content provided by the system 110. The content provider system 110 can illustratively be accessed by client computing devices 102 over a network 104. Client computing devices 102 can include any network-equipped computing device, for example desktop computers, laptops, smartphones, tablets, e-readers, set top boxes, virtual reality headsets, gaming consoles, and the like. The network 104 can include any appropriate network, including an intranet, the Internet, a cellular network, a local area network or any other such network or combination thereof. In FIG. 1, the network 104 is the Internet. Protocols and components for communicating via the Internet or any of the other aforementioned types of communication networks are known to those skilled in the art of computer communications and thus, need not be described in more detail herein.

Client computing devices 102 can access the content provider system 110 via the network 104 to obtain and view multimedia content, such as audio-visual content. Accordingly, the content provider system 110 can include multiple elements, which may represent distinct computing devices or logic executed on a single computing device, facilitating delivery of content to client computing devices. For example, the content provider system 110 includes a frontend 112 enabling client computing devices 102 to browse, search for, acquire access to, and obtain multimedia content. The frontend 112 may illustratively provide multiple ways to access content. For example, the frontend 112 may enable client computing devices 102 to stream content or to download content to their respective devices 102. The frontend 112 may provide various interfaces to client computing devices 102, such as graphical user interfaces (GUIs), command line interfaces (CLIs), application programming interfaces (APIs), and the like. For example, the frontend 112 may include a web server hosting web pages that facilitate the above-noted operations. In some instances, one or more client computing devices 102 may be used by creators of content, and the frontend 112 may thus facilitate submission of content to the content provider system 110. In accordance with embodiments of the present disclosure, submission of content to the content provider system 110 may trigger analysis of the content for desynchronization of audio streams, and either or both of correction of the streams or notification to a content creator if such desynchronization is detected.

Content provided by the content provider system 110 may be stored in a content data store 114, which represents any substantially persistent data store. For example, the content data store 114 may represent a hard disk drive (HDD), solid state drive (SSD), network attached storage (NAS), storage area network (SAN), other network-accessible storage (such as cloud-based object or block storage), or the like. Content items stored in the content data store 114 can include multimedia content having at least a video portion and an audio portion. These portions are generally referred to herein as "streams" (e.g., an "audio stream" and a "video stream"), though this designation should not necessarily imply streaming of content to client computing devices 102, as opposed to delivery via download. Streams for content may be stored distinctly within the content datastore 114 or collectively, such as within a media "container" file format. A wide variety of formats for audio streams, video streams, and containers are known in the art and therefore will not be enumerated herein.

In accordance with embodiments of the present disclosure, the content provider system 110 further includes a synchronization engine 116 configured to detect and potentially correct desynchronization of non-original audio to corresponding video via the techniques described herein. These techniques are described in more detail below with respect to FIGS. 3-6. As discussed below, the synchronization engine 116 may detect whether a non-original audio is correctly synchronized with corresponding video, and take responsive action if it is not. For example, the synchronization engine 116 may cause programmatic synchronization of the audio and video, such as by applying a time offset to audio to correct a synchronization error. As another example, the synchronization engine 116 may notify a content creator when a submitted content includes desynchronized audio, such that the creator can correct the error (e.g., manually or via the programmatic techniques described herein) and re-submit the content.

In instances where the synchronization engine 116 detects a correctable synchronization error, one mechanism to correct such an error is to re-encode the content while applying an audio offset appropriate to achieve synchronization. Accordingly, the content provider system 110 includes an encoder 118 to re-encode audio content, video content, or a combination thereof. As a result of re-encoding, the content can be correctly synchronized and therefore made available for delivery to client computing devices 102.

The content provider system 110 is depicted in FIG. 1 as operating in a distributed computing environment including several computer systems that are interconnected using one or more computer networks (not shown in FIG. 1). The content provider system 110 can also operate within a computing environment having a fewer or greater number of devices than are illustrated in FIG. 1. Thus, the depiction of the content provider system 110 in FIG. 1 should be taken as illustrative and not limiting to the present disclosure. For example, the content provider system 110 or various constituents thereof could implement various Web services components, hosted or "cloud" computing environments, and/or peer to peer network configurations to implement at least a portion of the processes described herein. Moreover, the environment 100 may include additional elements not shown in FIG. 1, such as a content distribution network (CDN) logically disposed between the content provider system 110 and client computing devices 102 and configured to distribute content of the content provider system 110 to client computing devices 102.

Further, the content provider system 110 may be implemented directly in hardware or software executed by hardware devices and may, for instance, include one or more physical or virtual servers implemented on physical computer hardware configured to execute computer executable instructions for performing various features that will be described herein. The one or more servers may be geographically dispersed or geographically co-located, for instance, in one or more data centers. In some instances, the one or more servers may operate as part of a system of rapidly provisioned and released computing resources, often referred to as a "cloud computing environment."

In the example of FIG. 1, the content provider system 110 is illustrated as connected to the network 104. In some embodiments, any of the components within the content provider system 110 can communicate with other components of the serverless code execution system 110 and stream data system 170 via the network 104. In other embodiments, another network (such as a private network not shown in FIG. 1) may enable communication between components within the content provider system 110.

Figure 3:
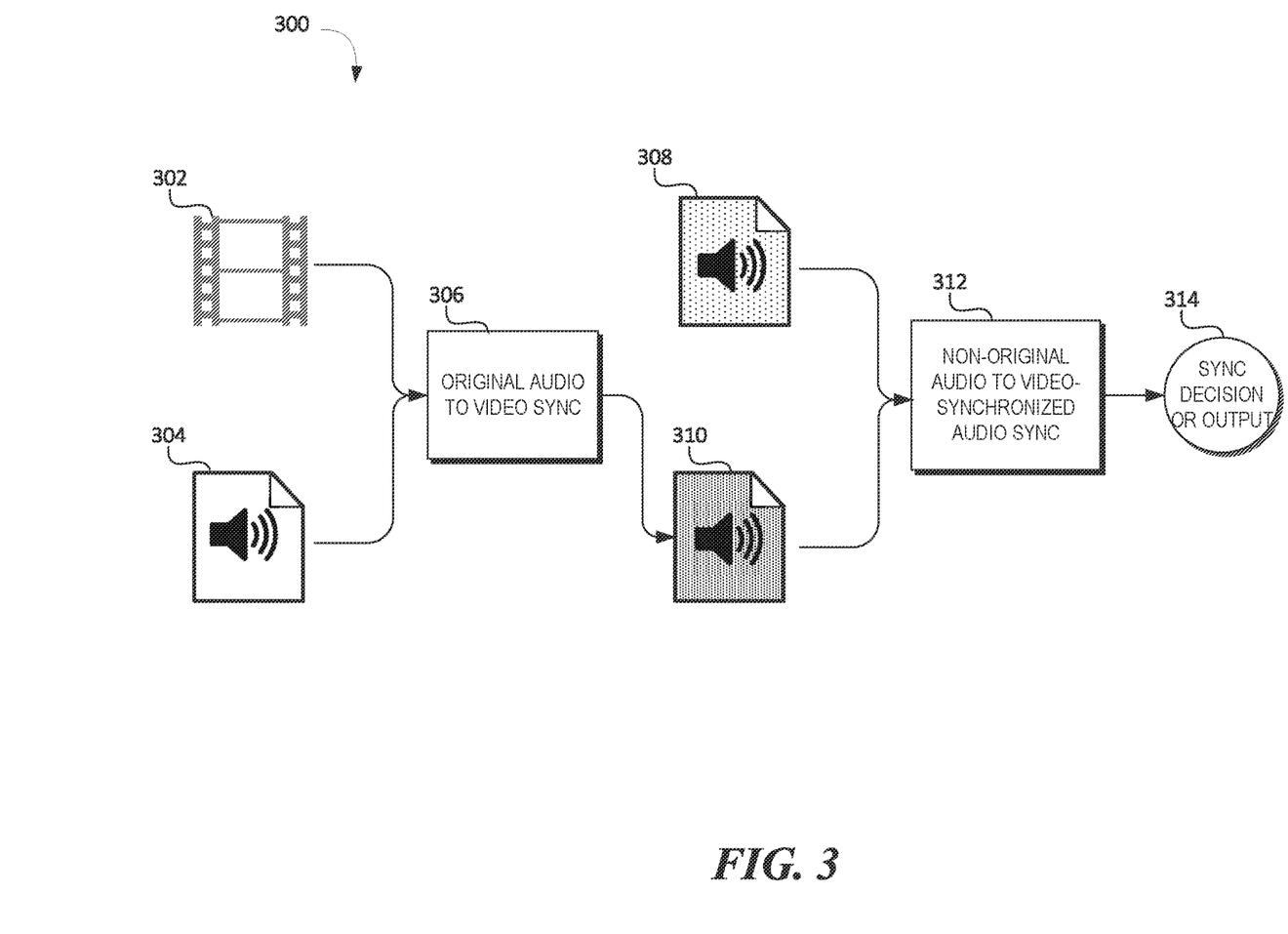
FIG. 3 depicts an example pipeline to synchronize video and non-original audio by first validating synchronization between an original audio stream and a video stream, and then synchronizing the non-original audio stream to the original audio stream to result in a synchronization output or decision.
Figure 4:
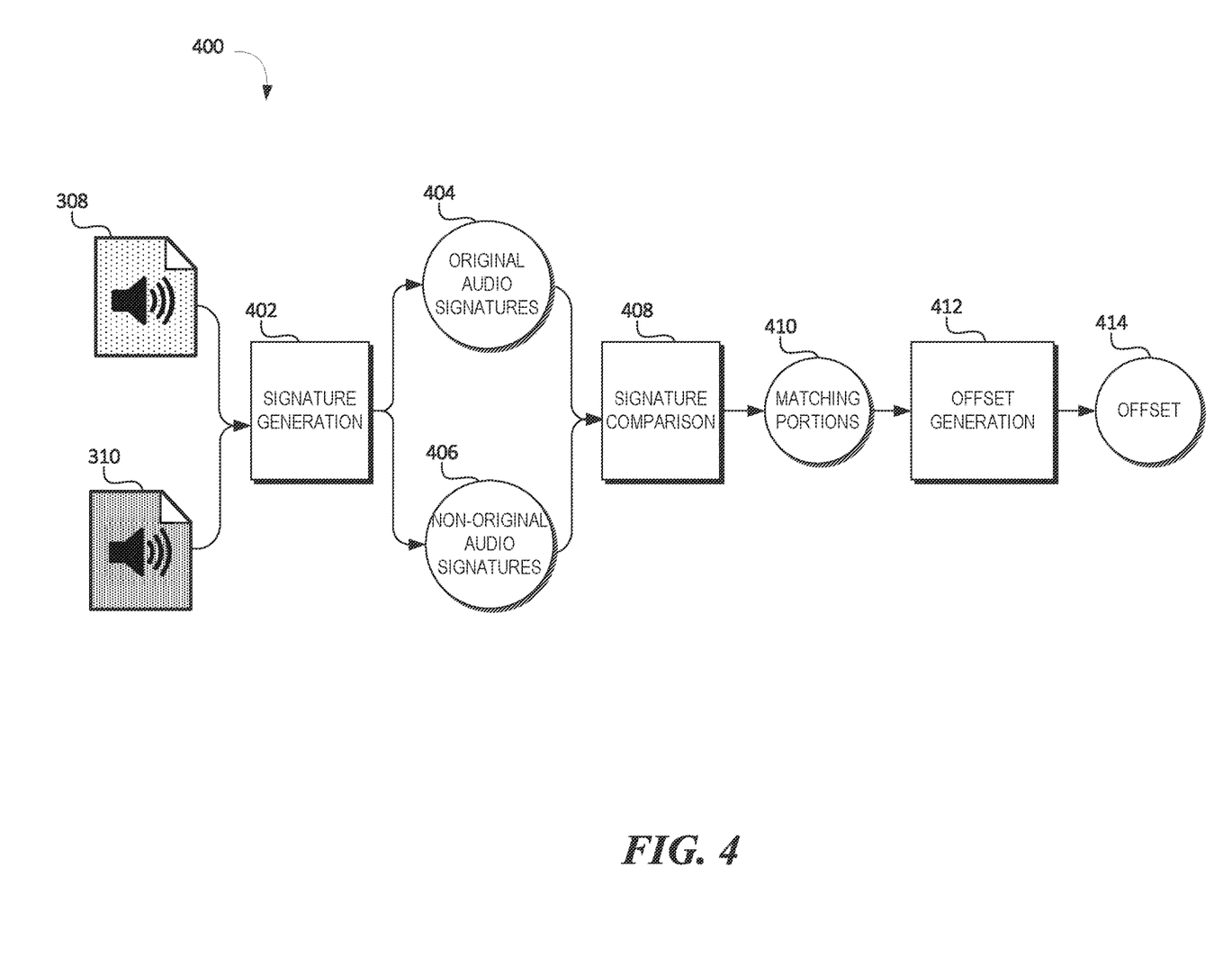
FIG. 4 depicts an example pipeline for synchronizing a non-original audio stream to an original audio stream, for example as part of the pipeline of FIG. 3, based on signatures of the respective audio streams.
Figure 5:
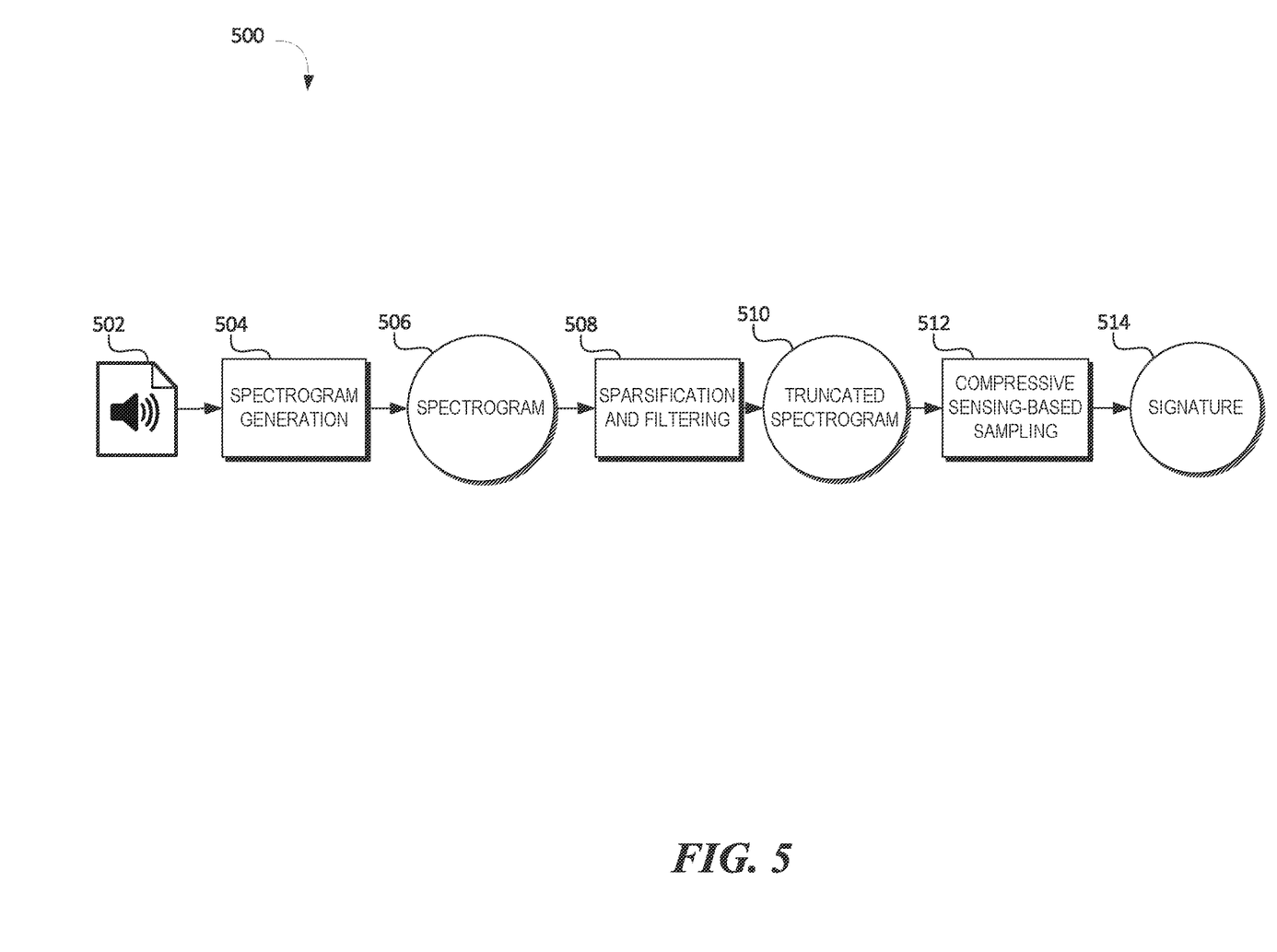
FIG. 5 depicts an example pipeline 500 for generating a signature of an audio stream, for example as part of the pipeline of FIG. 4, and in particular a pipeline for generating a reduced signature that can facilitate rapid comparison and require minimal data storage relative to a non-reduced signature.

With reference to FIGS. 3-5, illustrative visualizations will be described of pipelines (or processes) to synchronize video and non-original audio. Specifically, FIG. 3 depicts an example pipeline 300 to synchronize video and non-original audio by first validating synchronization between an original audio stream and a video stream, and then synchronizing the non-original audio stream to the original audio stream to result in a synchronization output or decision. FIG. 4 depicts an example pipeline 400 for synchronizing a non-original audio stream to an original audio stream, for example as part of the pipeline 300 of FIG. 3, based on signatures of the respective audio streams. FIG. 5 depicts an example pipeline 500 for generating a signature of an audio stream, for example as part of the pipeline 400 of FIG. 4, and in particular a pipeline for generating a reduced signature that can facilitate rapid comparison and require minimal data storage relative to a non-reduced signature. The pipelines of FIGS. 3-5 may be implemented, for example, by the synchronization engine 116 of FIG. 2. Illustratively, the synchronization engine 116 may be configured to implement the pipeline of FIG. 3 with respect to each new content submitted to the content provider system 110 that has a video stream corresponding to both original and non-original audio streams, or for content with a video stream, and original audio stream, and a particular type of non-original audio stream, such as an alternative language dubbed audio stream.

In FIGS. 3-5, the pipelines are generally depicted as a set of boxes illustrating operations, and circles or icons representing data processed via the operations. Accordingly, the pipeline 300 of FIG. 3 begins with a video stream 302 and an audio stream 304 being accepted into a synchronization operation for synchronizing original audio to video. As discussed above, embodiments of the present disclosure may provide for synchronization of a video stream to a non-original audio stream by synchronizing that non-original audio stream to an already-synchronized audio stream. Accordingly, the operation 306 may verify that the video stream 302 and original audio stream 304 are correctly synchronized. In some embodiments, the operation 306 may programmatically adjust either or both of the video stream 302 and audio stream 304 to ensure synchronization of those two streams. A variety of programmatic synchronization techniques may be used, including the SyncNet model discussed above or the techniques described in the '212 Application, incorporated by reference above. In some embodiments, the pipeline 300 may assume that a synchronized audio stream exists for a video, and as such, operation 306 may be omitted. For example, such an assumption may hold when the video stream 302 and the audio stream 304 have been manually synchronized or created using a single item of recording equipment. In the instance that synchronization cannot be achieved (e.g., that programmatic correction fails and no known synchronized stream is available), the pipeline may terminate with an error, such as by notifying a creator or third-party provided that no synchronized audio exists for a video stream.

If synchronization (or validation thereof) succeeds the operation 306 illustratively results in a video-synchronized audio stream 310. This video-synchronized audio stream 310 is then input along with a non-original audio stream 308 (such as a dubbed audio stream) into operation 312, which synchronizes the non-original audio stream 308 to the video-synchronized audio stream 310. An illustrative process for synchronizing non-original audio stream 308 to a video-synchronized audio stream 310 is described in more detail below as pipeline 400 of FIG. 4. In general, the operation 312 may synchronize the original audio stream 308 to the video-synchronized audio stream 310 by determining a set of correspondence point pairs between the two streams, indicating matching portions of the respective streams. From the set of correspondence point pairs, one or more offsets may be generated indicating differences in locations of the respective correspondence points of each pairs. For example, the operation 312 may indicate that the non-original audio stream 308 lags or leads the video-synchronized audio stream 310 by a fixed or variable number of milliseconds, thus enabling synchronization.

As a result, the operation 312 provide a synchronization decision or output. In one embodiment, the output is a binary classification, such as a decision that the non-original audio stream is or is not synchronized to the video stream. Such a classification may be based, for example, on a statistical measurement of the offsets determined according to correspondence point pairs. Illustratively, the operation 312 may be configured to apply a threshold, such that synchronization is indicated only if a statistical measure of the offsets (e.g., an average, a given percentile, etc.) satisfies the threshold value. In one embodiment, the threshold value is set according to expected perceptibility by human viewers. For example, the threshold may be set at around 50 milliseconds. Accordingly, if a classification of "synchronized" occurs, the pipeline 300 may indicate that the video and non-original audio are correctly synchronized, and thus make the content available to client computing devices 102. If a classification of "not synchronized" occurs, the pipeline 300 may raise an error to a provider of the content, and render the content unavailable to client computing devices 102.

In some embodiments, operation 312 may include programmatically modifying the non-original audio stream 308, the video stream 302, or both to result in synchronization of the two streams. For example, where the offset or offsets fall within a threshold level, the operation 312 may include reencoding the non-original audio stream 308 to apply the offset or offsets (e.g., by inserting blank audio at portion the non-original audio stream 308 to create lead or lag, by adjusting the speed of playback of the non-original audio stream 308, etc.). Illustratively, the synchronization engine 116 may provide the non-original audio 304 and the offset or offsets to the encoder 118, which may provide a video-synchronized non-original audio 304 in response. As a result, synchronization errors between the non-original audio stream 308 and the video stream 302 can be resolved, and the non-original audio stream 308 can be synchronized to the video stream 302.

With reference to FIG. 4, an example pipeline 400 will be described for synchronizing a non-original audio stream to an original audio stream based on signatures of the respective audio streams. The pipeline 400 may be implemented, for example, as all or part of operation 312 of the pipeline 300. Accordingly, the pipeline 400 takes as input both an original audio stream 310 and a non-original audio stream 308. When utilized to synchronize the non-original audio stream 308 to a video stream, the original audio stream 310 may be a video-synchronized audio stream.

At operation 402, signatures are generated for both the original audio stream 310 and a non-original audio stream 308. As discussed above, the term "signature" is generally intended to refer to a sufficiently unique representation of at least a portion of an audio stream, such that two signatures can be compared to identify corresponding portions of two corresponding audio streams. In one embodiment, the signatures are full-fidelity signatures, such as a spectrogram of an audio stream exactly representing the audio stream, which spectrogram may be generated, for example, via processing of the audio stream through a Fourier-related transform. In another embodiment, the signatures are reduced signatures, such as those generated via the pipeline 500 of FIG. 5, discussed in more detail below. In yet other embodiments, signatures may be generated via other operations. For example, a machine learning model may be utilized to generate signatures for audio streams. As an illustration, a neural network may be trained with a set of audio streams and corresponding signatures (e.g., generated according to the mechanisms described herein) to result in a trained model that can process additional streams and produce additional signatures.

As a result of operation 402, original audio signature 404 and non-original audio signature 406, representing the original audio stream 310 and a non-original audio stream 308, respectively, are generated. These signatures 404 and 406 are then passed into operation 408, where they are compared to identify matching portions 410 of the two streams 308. Illustratively, operation 408 may include a portion-by-portion comparison of the signatures 404 and 406, whereby each portion of a signature of one stream (e.g., each frame within the signature 404, which may represent one column of the data matrix representing the signature) is compared with portions of the other stream (e.g., within signature 406) representing portions within a window of specified duration around the signature of the first stream. For example, using a 4 second window, a portion of the signature 404 for the timestamp 01:15:31 may be compared to portions of signature 406 representing the timestamp range 01:15:29 through 01:15:33. A match may be determined if two portions (e.g., two columns) are sufficiently similar. Similarly may be measured based on distance between the two portions, such as by measurement of the Chebyshev distance (also known as the La distance) between two columns of a spectrogram. In one embodiment, a threshold similarity is pre-configured, and portions are said to match when the portions satisfy that threshold similarity.

Each matching portion may be represented as a correspondence point pair, representing a timestamp in a first audio stream that matches a timestamp in a second audio stream. Accordingly, an offset 414 may be determined for each correspondence point pair as the difference in locations of the two correspondence points making up the pair. As such, at operation 412, one or more offsets are determined for synchronizing the original audio stream 310 and a non-original audio stream 308. In some instances, a single offset may be determined, which single offset may represent, for example, the average of all offsets for all correspondence point pairs. Illustratively, the pipeline 400 may result in a single offset when all offsets for all correspondence point pairs (or a threshold percentage of such offsets) fall within a threshold range, such as within 50 ms of one another. In other instances, multiple offsets may be determined. For example, where offsets for the correspondence point pairs do not fall within a threshold range of one another, a variable offset (or equivalently multiple offsets) may be determined, with a first offset applying to a first location in one of the audio streams, a second offset applying to a second location in the audio stream, etc. Use of a multiple offsets may enable synchronization even when desynchronization is inconsistent between the two audio streams.

The offset 414 may then be utilized to classify the non-original audio stream 308 as synchronized or not synchronized, or to adjust the non-original audio stream 308 to synchronize it with the original audio stream 310, and thus correspondence video. For example, as noted above, the offset (or offsets) may be provided to an encoder to reencode the non-original audio stream 308 and thus achieve synchronization.

As noted above, synchronization of a non-original audio stream 308 to an original audio stream 310 may be achieved by comparison of signatures for the respective streams. To facilitate rapid comparison, pipeline 500 may be implemented to generate reduced signatures for each stream, which may adequately represent portions of each stream for purposes of comparison, but require significantly fewer computing resources (e.g., processing power and storage) when being compared.

The pipeline begins at operation 504, where a spectrogram 506 is generated for an input audio stream 502. The spectrogram 506 can represent the audio stream as a data matrix, such as a two dimensional matrix arranged according to frequency and time dimensions, with data points in the matrix representing amplitude (or "loudness") as values. Illustratively, the spectrogram 506 can be generated by passing the input audio stream 502 through a Fourier-related transform, such as the Short-time Fourier transform.

The spectrogram 506 can illustratively represent a full fidelity signature of the input audio stream 502. To reduce a data size of the signature (and thus the computing resources used to process the signature), the spectrogram 506 is passed through a sparsification and filtering operation 508. As used herein, sparsification generally represents an operation to create sparse data from input data. Specifically, in operation 508, sparsification can include zeroing out data points in the spectrogram 506 with values under a specified threshold, thereby removing minor noise from representation within the spectrogram 506. The value may generally be set such that only minor noise (such as imperceptible or barely perceptible background noise) is removed. For example, the spectrogram 506 may represent amplitude as a decibel value, and the threshold may be set to a low decibel value. Accordingly, the total set of values in the spectrogram 506 is reduced. In addition, operation 508 can include filtering the spectrogram 506 to remove data not necessary or unhelpful for comparison. In one embodiment, such data includes columns of the spectrogram 506 (e.g., each representing a frame of the input audio stream 502) that are either too loud (having more than a threshold number of values above a threshold level) or too soft (having more than a threshold number of values below a threshold level, which may be zero due to the sparsification operation noted above). Through sparsification and filtering, a truncated spectrogram 510 is produced with a total size that is significantly reduced relative to the spectrogram 506, often by an order of magnitude.

To further reduce the size of the truncated spectrogram 510, the pipeline 500 includes a compressive sensing-based sampling operation 512, which samples the truncated spectrogram 510 to identify a representative reduced signature 514. In general, the compressive sensing-based sampling operation 512 can multiple the truncated spectrogram 510 by a compressive sensing matrix. While a variety of such matrixes are possible, in one embodiment the compressive sensing matrix is a Bernoulli matrix of dimensions M*F, where F is a frequency dimensionality matching the signature's frequency dimensionality and M is a measurement dimension equal to F divided by a compression ratio (which may be, for example, a power of 2 between $2^1$ and $2^{10}$, such as 32, 64, etc. When randomly initialized, the compressive sensing matrix may be held constant with respect to signatures being compared (e.g., during an implementation of pipeline 300) to ensure comparability of signatures. A result of this multiplication may be the signature 514, which in this example has a dimensionality of M*T, where T represents the time dimensionality of the truncated spectrogram 510. Such a signature may be orders of magnitude smaller than an initial spectrogram 506, enabling rapid comparisons and thus rapid synchronization. As noted above, signatures 514 of multiple audio streams may then be compared to determine corresponding portions of such streams and to facilitate alignment.

Figure 6:
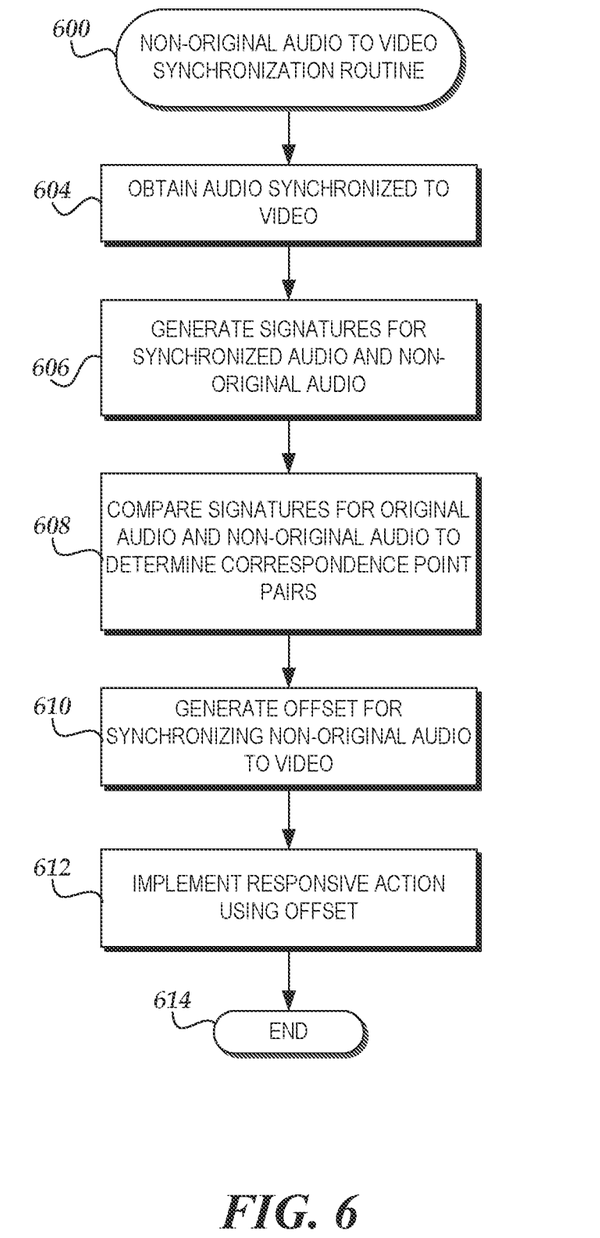
FIG. 6 depicts an illustrative routine for synchronization of a non-original audio stream to a corresponding video stream.

With reference to FIG. 6, an illustrative routine 600 will be described for synchronization of a non-original audio stream to a corresponding video stream, in accordance with embodiments of the present disclosure. The routine 600 may be implemented, for example, by the content provider system 110, such as via the synchronization engine 116. Illustratively, the routine 600 may be implemented in response to a new multimedia content, comprising a video stream and multiple audio streams, being uploaded to the content provider system 110. Additionally or alternatively, the routine 600 may be implemented as a "backlog" process to process each previously unprocessed candidate multimedia content on the content provider system 110, where such candidate multimedia contents include contents comprising a video stream and multiple audio streams.

The routine 600 begins at block 604, where the content provider system 110 obtains an audio stream synchronized to the video stream. The audio stream may, for example, be an original audio stream created concurrently with the video stream, such as via shared recording equipment. In one embodiment, the routine 600 may be implemented under an assumption of synchronization between the input audio stream and the video stream. In another embodiment, the routine 600 may be extended to validate synchronization, such as by passing the input audio stream and the video stream through the SyncNet model, discussed above, or processing these inputs via the techniques disclosed in the '212 Application, incorporated by reference above. As noted below, the synchronized audio stream may then be utilized to synchronize the non-original audio stream to the video stream.

Specifically, at block 606, the content provider system 110 generates signatures for each of the synchronized audio stream and the non-original audio stream. Generation of signatures may occur, for example, based on generation of a spectrogram for each audio stream. As noted above, such a signature may include sufficient information to identify corresponding portions of the two audio streams. For example, a spectrogram represented as a data matrix may include columns for each portion of an audio stream (e.g., each frame), with row values for the column indicating amplitude (e.g., in decibels) for a frequency of sound within that portion of the audio stream. In some embodiments, each signature may be a reduced signature, such as a signature generated via the routine 500 of FIG. 5. For example, each signature may be processed via sparsification, filtering, compressive-sensing based sampling, or a combination thereof. Accordingly, the total data size of each signature can be reduced without inhibiting sufficiently unique identification of portions of each audio stream.

At block 608, the content provider system 110 conducts a comparison of the two signatures to identify corresponding portions of the two audio streams. Illustratively, the content provider system 110 may implement a sliding window approach, whereby each portion of one signature (e.g., each column of a data matrix) is compared to multiple possibly matching portions of the other signature to determine whether a match exists. For example, where the signatures are divided into frames, each frame of a first signature may be compared to frames of the other signature in a time range around the frame of the first signature (e.g., plus or minus n seconds with respect to the timestamp of the frame of the first signature). Where signatures are represented as data matrices, each column of a first data matrix may be compared to a corresponding column of the second data matrix, as well as preceding and subsequent columns within a given distance (e.g., where distance may be set as a threshold time range divided by a time duration for audio represented by each column). Via such comparison, matching portions may be identified, which represent corresponding audio content of the respective audio streams. For example, matching portions may represent the same audio in both streams, such as the same sound effect. In one embodiment, matching of portions occurs via a distance function, where matching occurs when the distance between the two portions is less than a threshold amount. Illustratively, the distance function may be the Chebyshev distance (also known as the $L_{inf}$ distance). Each matched pair may correspond to a point in the respective audio stream, such as a timestamp indicated by a column of the audio stream that is determined to match. Accordingly, each matched pair may be stored as a correspondence point pair, indicating a point in the non-original audio stream that corresponds to a point in the synchronized audio stream.

At block 610, the content provider system 110 generates an offset for synchronizing the non-original audio stream to the video stream. As discussed above, the offset may be a fixed offset, or may be a variable offset (e.g., as a set of offsets for different points in the stream). Illustratively, where the correspondence point pairs indicates a stable offset value, such that difference in the two locations indicated by each pair is a stable value (e.g., varying by less than a threshold amount among the correspondence point pairs), the content provider system 110 may generate a fixed offset, which may for example be an average of the location difference indicated by each correspondence point pair. For example, if each correspondence point pair indicates, on average, that the non-original audio stream lags the video stream by 125 ms (potentially with some pairs being divided by 130 ms, others by 120 ms, etc.), the fixed offset may be set at 125 ms. Where correspondence point pairs indicate a non-stable value, such that the difference in the two locations indicated by each pair varies among the pairs by more than a threshold amount, the content provider system 110 may implement a dynamic offset, representing multiple offsets applied at different locations in the audio stream. In some embodiments, the dynamic offset may be generated only when a change in offset between consecutive pairs is less than a threshold amount, representing an acceptable rate of change for the dynamic offset. For example, a dynamic offset may be generated when a first pair indicates an offset of 50 ms and a second indicates an offset of 55 ms. Where two pairs indicate widely different offsets (e.g., where "wide" may be set as a function of distance between the locations of the pairs), the routine 600 may indicate that no offset can be generated, as this may indicate an error in the routine 600 or in the input content. For example, if first correspondence point indicates an offset of −250 ms, and a second correspondence point occurring only a few seconds later within the stream indicates an offset of +250 ms, this rapid shift in offset (a half second over only a few seconds time) may indicate errors in the content or the routine 600, and as such the offset may be generated as a null value (e.g., as "null", "NAN", etc.).

At block 612, the content provider system 110 can implement a responsive action using the offset. Illustratively, block 612 can include detecting whether a synchronization error exists between the non-original audio stream and the video stream. For example, a synchronization error may be determined when the offset cannot be generated due to error, when the offset falls outside of a threshold value (e.g., an absolute value, such a fixed offset of more than 500 ms), or when the offset is a dynamic offset with a range of offsets outside a threshold range (e.g., when the dynamic offset varies by more than 250 ms). In cases where a synchronization error is determined, the content provider system 110 may notify a provider of the content that a synchronization error has occurred and must be addressed. In some cases, if a synchronization error is determined and the offset falls within the threshold range, the content provider system 110 may attempt to programmatically synchronize the non-original audio stream to the video stream. For example, the content provider system 110 may reencode the non-original audio stream, the video stream, or both such that the correspondence point pairs occur at a common time in the respective streams. Illustratively, the content provider system 110 may re-encode the non-original audio stream to transpose the audio stream according to the determined offset (e.g., while inserting blank or other audio content into excess space within the stream and cropping audio content shifted outside of a timeframe of the stream), slow down or speed up the audio stream according to the determined offset, or both. Accordingly, non-original audio stream can be adjusted to be synchronized to the video stream. The routine 600 then ends at block 614.

While FIG. 6 is discussed with respect to an entire multimedia content, in some embodiments the routine 600 may be modified to apply to portions of multimedia content. For example, the routine 600 may be modified to apply in the context of streaming media, to programmatically synchronize audio and video content of the media. Illustratively, a live video stream of a foreign language speaker may be associated with both the original audio (in the foreign language) and translated non-original audio, such as created via a live translator (which may be human or automated). Embodiments of the present disclosure may synchronize the streaming video with the streaming non-original audio by synchronization of the non-original audio to the original audio. Illustratively, as portions of each audio stream are received, a signature may be generated for such portions and compared to signatures of nearby portions of the other stream. A sufficient playback delay, with a duration corresponding to the time window for matching signatures and/or a required processing time to generate and match signatures, may be implemented to allow for such matching. When an end user consumes the video and non-original audio, the video and/or audio may be adjusted to synchronize these two streams, such as by delaying the video stream to matching a speaker shown in the video to the corresponding points in the non-original audio. While embodiments are discussed herein with respect to translated content, other non-original audio is possible. For example, embodiments disclosed herein may be applied to synchronize video of an event (such as a sports or e-sports event) with voiceover commentary on the event, such as by identifying matches between background noise of the event in original audio and the same background noise in the voiceover commentary. The particular signature generation used may vary according to the desired application. For example, when adjusting for live translation of a foreign speaker, the signature for each audio stream may emphasize pauses (low volume portions) of each stream, to align the cadence of speech in each audio stream. When adjusting for voiceovers of live events, such as sports or e-sports, the signature for each audio stream may emphasize high volume portions, such as crowd cheering, which may indicate matching portions of two audio streams sufficient to align a non-original audio stream with the video stream via an original audio stream. Accordingly, the present disclosure may provide for synchronization of non-original audio stream to a video stream in a wide variety of contexts.

Moreover, in addition to synchronization of non-original audio stream to a video stream, embodiments of the present disclosure may utilize techniques described herein for other uses. As an illustration, all or a portion of the pipeline 400 of FIG. 4 may be utilized to identify matching portions between two audio streams, potentially outside the context of synchronization. For example, operations 402 and 408 may be utilized with two audio streams of no known relation in order to determine whether the audio streams share content. Illustratively, the window for comparison at operation 408 may be widened to encompass the entirety of a second audio stream, and as such any portions of a first audio stream matching a portion of a second audio stream may be identified. These techniques may thus be applied in other contexts, such as detection of copyright infringement by one audio stream with respect to another audio stream. In another example, the techniques described herein (and particularly operations 402 and 408 of pipeline 400) may be applied to detect matching portions within a single audio stream, such as loops or other repition. In such an example, the single audio stream may represent both inputs to the signature generation and comparison operations. Experimentally, the signature generation and comparison techniques described herein have generally been shown to provide for audio-to-audio matching at a much faster rate than other available audio-matching techniques, such as known audio finger printing techniques. In particular, the signatures generated by the techniques disclosed herein can provide for a much smaller representation of an audio stream than alternative audio-matching techniques, thereby enabling more rapid comparison of audio streams in a wide variety of contexts.

Figure 7:
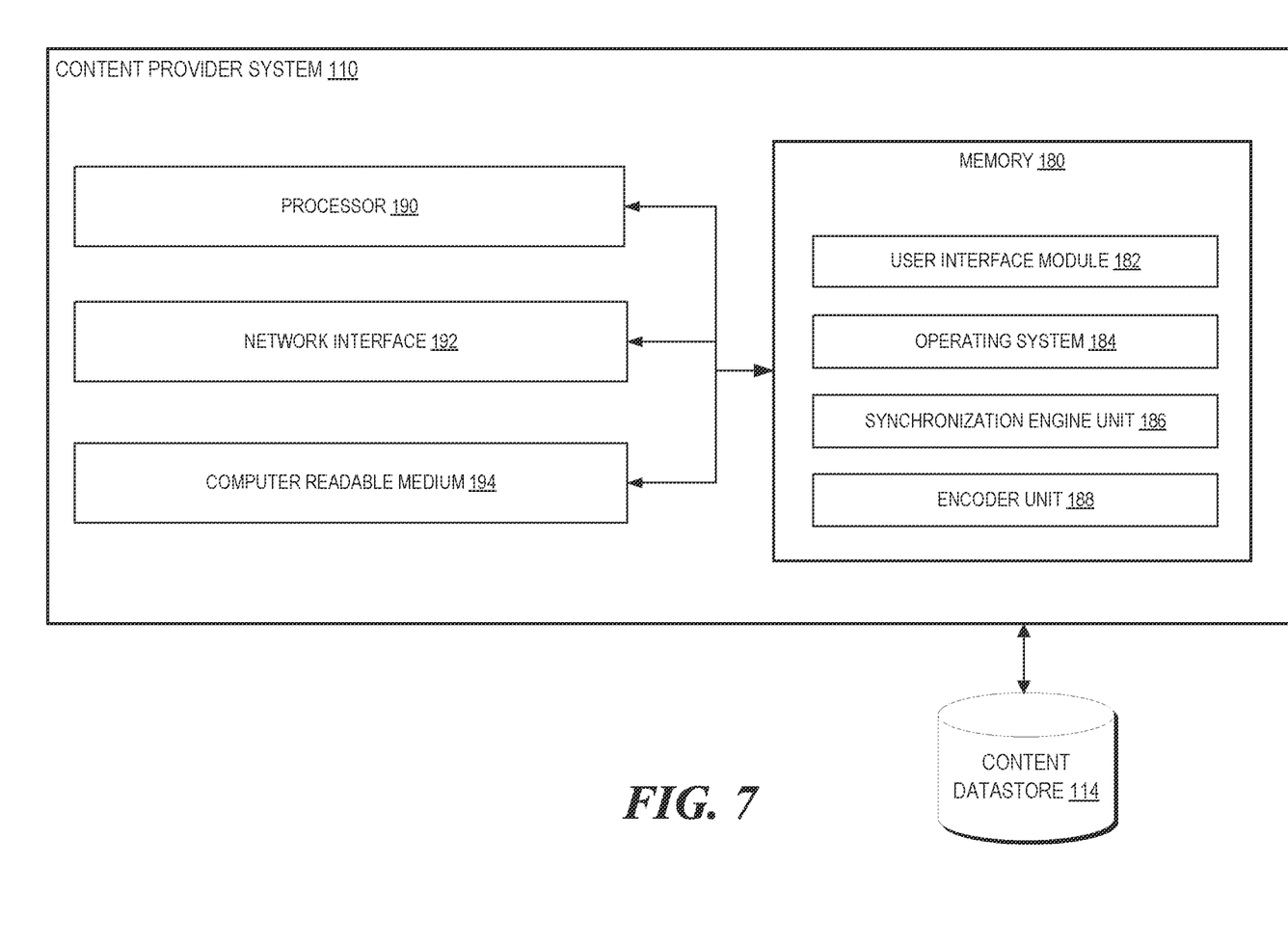
FIG. 7 depicts a general architecture of a computing device or system that can be used to perform one or more of the techniques described herein.

FIG. 7 depicts an example architecture of a computing system (referred to as the content provider system 110) that can be used to perform one or more of the techniques described herein or illustrated in FIGS. 1-6. The general architecture of the content provider system 110 depicted in FIG. 7 includes an arrangement of computer hardware and software modules that may be used to implement one or more aspects of the present disclosure. The content provider system 110 may include many more (or fewer) elements than those shown in FIG. 7. It is not necessary, however, that all of these elements be shown in order to provide an enabling disclosure. As illustrated, the content provider system 110 includes a processor 190, a network interface 192, and a computer readable medium 194, all of which may communicate with one another by way of a communication bus. The network interface 192 may provide connectivity to one or more networks or computing systems. The processor 190 may thus receive information and instructions from other computing systems or services via the network 104 illustrated in FIG. 2.

The processor 190 may also communicate with memory 180. The memory 180 may contain computer program instructions (grouped as modules or units in some embodiments) that the processor 190 executes in order to implement one or more aspects of the present disclosure. The memory 180 may include random access memory (RAM), read only memory (ROM), and/or other persistent, auxiliary, or non-transitory computer-readable media. The memory 180 may store an operating system 184 that provides computer program instructions for use by the processor 190 in the general administration and operation of the export system 210. The memory 180 may further include computer program instructions and other information for implementing one or more aspects of the present disclosure. For example, in one embodiment, the memory 180 includes a user interface module 182 that generates user interfaces (and/or instructions therefor) for display upon a user computing device, e.g., via a navigation and/or browsing interface such as a browser or application installed on the user computing device.

In addition to and/or in combination with the user interface module 182, the memory 180 may include a synchronization engine unit 186 and encoder unit 188. In one embodiment, the synchronization engine unit 186 and encoder unit 188 when executed implements various aspects of the present disclosure, e.g., detecting and/or programmatically correcting synchronization errors between a non-original audio stream and a video stream, and/or other aspects discussed herein or illustrated in FIGS. 1-6. Illustratively, the synchronization engine unit 186 may include code corresponding to the synchronization engine 116 and the encoder unit 188 may contain code corresponding to the encoder 118.

While synchronization engine unit 186 and encoder unit 188 are shown in FIG. 6 as part of the content provider system 110, in other embodiments, all or a portion of the synchronization engine unit 186 and encoder unit 1888 may be implemented by another computing device. For example, in certain embodiments of the present disclosure, another computing device in communication with the content provider system 110 may include several modules or components that operate similarly to the modules and components illustrated as part of the content provider system 110. In some instances, the synchronization engine unit 186 and encoder unit 188 may be implemented as one or more virtualized. Moreover, the synchronization engine unit 186 and encoder unit 188 may be implemented in whole or part as a distributed computing system including a collection of devices that collectively implement the functions discussed herein.

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system may be a cloud-based computing system whose processing resources are shared by multiple distinct business entities or other users.

The processes described herein or illustrated in the figures of the present disclosure may begin in response to an event, such as on a predetermined or dynamically determined schedule, on demand when initiated by a user or system administrator, or in response to some other event. When such processes are initiated, a set of executable program instructions stored on one or more non-transitory computer-readable media (e.g., hard drive, flash memory, removable media, etc.) may be loaded into memory (e.g., RAM) of a server or other computing device. The executable instructions may then be executed by a hardware-based computer processor of the computing device. In some embodiments, such processes or portions thereof may be implemented on multiple computing devices and/or multiple processors, serially or in parallel.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. All changes which come within the meaning and range of equivalency of the claims are to be embraced within their scope.

What is claimed is:

1. A system for correcting desynchronization in multimedia contents including non-original audio streams, the system comprising:
    a data store including multimedia content, wherein the multimedia content comprises a video stream, an original audio stream, and a non-original audio stream; and
    one or more processors implementing a synchronization engine, the one or more processors configured to:
        verify that the original audio stream is synchronized to the video stream;
        synchronize the non-original audio stream to the original audio stream at least partly by:
            generating a first signature for the original audio stream and a second signature for the non-original audio stream;
            comparing the first signature to the second signature to determine one or more correspondence point pairs, each correspondence point pair identifying a location in the original audio stream with audio content matching a location in the non-original audio stream; and
            determining, from the one or more correspondence point pairs, an offset synchronizing the non-original audio stream to the original audio stream;
        detect, based at least partly on the offset synchronizing the non-original audio stream to the original audio stream, whether a synchronization error exists between the video stream and the non-original audio stream; and
        responsive to detecting that a synchronization error exists between the video stream and the non-original audio stream, synchronize the non-original audio stream to the video stream by applying to the non-original audio stream the offset synchronizing the non-original audio stream to the original audio stream.

2. The system of claim 1, wherein the original audio stream is an audio stream created simultaneously with the video stream, and wherein the non-original audio stream is created subsequent to creation of the video stream.

3. The system of claim 1, wherein the non-original audio stream is an alternative language audio stream for the video stream.

4. The system of claim 1, wherein each of the first and second signatures is a spectrogram representing the respective original and non-original audio streams as a data matrix.

5. A computer-implemented method for detecting synchronization errors in a non-original audio stream of a multimedia content to a video stream of the multimedia content, the computer-implemented method comprising:
    generating a first signature for the non-original audio stream and a second signature for an additional audio stream that is synchronized to the video stream;
    comparing the first signature to the second signature to determine one or more correspondence point pairs, each correspondence point pair identifying a location in the non-original audio stream with audio content matching a location in the additional audio stream;

determining, from the one or more correspondence point pairs, an offset synchronizing the non-original audio stream to the additional audio stream; and detecting, based at least partly on the offset synchronizing the non-original audio stream to the additional audio stream, whether a synchronization error exists between the video stream and the non-original audio stream.

6. The computer-implemented method of claim 5 further comprising validating that the additional audio stream is synchronized to the video stream.

7. The computer-implemented method of claim 5 further comprising synchronizing the non-original audio stream to the video stream by applying to the non-original audio stream the offset synchronizing the non-original audio stream to the original audio stream.

8. The computer-implemented method of claim 5, wherein the offset is at least one of a fixed offset or a dynamic offset.

9. The computer-implemented method of claim 5, wherein detecting, based at least partly on the offset synchronizing the non-original audio stream to the additional audio stream, whether the synchronization error exists between the video stream and the non-original audio stream comprises determining whether the offset satisfies a threshold absolute value.

10. The computer-implemented method of claim 5, wherein detecting, based at least partly on the offset synchronizing the non-original audio stream to the additional audio stream, whether the synchronization error exists between the video stream and the non-original audio stream comprises determining whether the offset varies by more than a threshold value.

11. The computer-implemented method of claim 5, wherein generating each signature comprises transforming a respective audio stream intro a spectrogram according to a Short-time Fourier transform.

12. The computer-implemented method of claim 11, wherein generating each signature further comprises passing each a spectrogram through a sparsification and filtering operation to result in a truncated spectrogram.

13. The computer-implemented method of claim 12, wherein generating each signature further comprises applying compressive sensing-based sampling to each truncated spectrogram to result in a reduced signature.

14. The computer-implemented method of claim 13, wherein applying compressive sensing-based sampling to each truncated spectrogram comprises multiplying each truncated spectrogram by a randomly initialized Bernoulli matrix.

15. One or more non-transitory computer-readable media comprising executable instructions for detecting synchronization synchronizing a non-original audio stream of a multimedia content to a video stream of the multimedia content, wherein the instructions, when executed by a computing system, cause the computing system to:

generate a first signature for the non-original audio stream and a second signature for an additional audio stream that is synchronized to the video stream;

compare the first signature to the second signature to determine one or more correspondence point pairs, each correspondence point pair identifying a location in the non-original audio stream with audio content matching a location in the additional audio stream;

determine, from the one or more correspondence point pairs, an offset synchronizing the non-original audio stream to the additional audio stream; and detect, based at least partly on the offset synchronizing the non-original audio stream to the additional audio stream, whether a synchronization error exists between the video stream and the non-original audio stream.

16. The one or more non-transitory computer-readable media of claim 15, wherein to compare the first signature to the second signature to determine one or more correspondence point pairs, the instructions cause the computing system to compare each portion of the first signature to a set of portions of the second signature, the set of portions representing portions of the second within a time window surrounding a location of each portion of the first signature.

17. The one or more non-transitory computer-readable media of claim 15, wherein the instructions further cause the computing system to synchronize the non-original audio stream to the video stream by applying to the non-original audio stream the offset synchronizing the non-original audio stream to the additional audio stream.

18. The one or more non-transitory computer-readable media of claim 15, wherein the instructions cause the computing system to generate each signature by transforming a respective audio stream intro a spectrogram according to a Short-time Fourier transform.

19. The one or more non-transitory computer-readable media of claim 17, wherein the instructions further cause the computing system to generate each signature by passing each a spectrogram through a sparsification and filtering operation to result in a truncated spectrogram.

20. The one or more non-transitory computer-readable media of claim 19, wherein the instructions further cause the computing system to generate each signature by applying compressive sensing-based sampling to each truncated spectrogram to result in a reduced signature.

* * * * *

UNITED STATES PATENT AND TRADEMARK OFFICE
CERTIFICATE OF CORRECTION

PATENT NO. : 11,610,610 B1
APPLICATION NO. : 17/643805
DATED : March 21, 2023
INVENTOR(S) : Vajpayee et al.

It is certified that error appears in the above-identified patent and that said Letters Patent is hereby corrected as shown below:

In the Specification

Column 16, Line 52, delete "repition." and insert -- repetition. --.

In the Claims

Column 21, Line 15, Claim 7, delete "original" and insert -- additional --.

Signed and Sealed this
Twenty-seventh Day of June, 2023

Katherine Kelly Vidal
*Director of the United States Patent and Trademark Office*